United States Patent [19]
Funami et al.

[11] Patent Number: 5,200,010
[45] Date of Patent: Apr. 6, 1993

[54] METHOD FOR MANUFACTURING LENS ARRAY OPTICAL SYSTEM

[75] Inventors: Koji Funami, Hirakata; Yuji Uesugi, Osaka; Yukio Nishikawa, Ikeda, all of Japan

[73] Assignee: Matsushita Electric Industrial co., Ltd., Osaka, Japan

[21] Appl. No.: 794,054

[22] Filed: Nov. 19, 1991

[30] Foreign Application Priority Data

Nov. 20, 1990 [JP] Japan .................. 2-317246

[51] Int. Cl.⁵ .................................. B32B 31/00
[52] U.S. Cl. .................................. 156/154; 156/155; 156/275.5; 156/275.7; 156/299; 65/38
[58] Field of Search .................. 156/275.7, 275.5, 297, 156/299, 153, 154, 155; 65/23, 38, 37

[56] References Cited

U.S. PATENT DOCUMENTS

| | | | |
|---|---|---|---|
| 2,434,614 | 1/1948 | Hicks | 156/154 |
| 4,104,099 | 8/1978 | Scherrer | 156/299 |
| 4,239,567 | 12/1980 | Winings | 156/154 |
| 4,297,401 | 10/1981 | Chern et al. | 156/275.5 |
| 4,422,893 | 12/1983 | Duchateau et al. | 156/297 |
| 4,474,639 | 10/1984 | Fritz | 156/299 |
| 4,638,552 | 1/1987 | Shimbo et al. | 156/154 |
| 4,961,802 | 10/1990 | Otsuki et al. | 156/153 |
| 5,009,731 | 4/1991 | Yoshikawa et al. | 156/275.7 |

FOREIGN PATENT DOCUMENTS

| | | | |
|---|---|---|---|
| 3801805 | 8/1989 | Fed. Rep. of Germany | 156/297 |
| 8100536 | 3/1981 | PCT Int'l Appl. | 156/154 |

*Primary Examiner*—Robert L. Lindsay
*Attorney, Agent, or Firm*—Wenderoth, Lind & Ponack

[57] ABSTRACT

A method is disclosed for manufacturing a lens array optical system including a flat glass plate and lenses each of which has a flat surface and a curved surface. The method includes the steps of removably fixing each lens with a first adhesive agent to a lens holder having lens holding portions corresponding to the curved surfaces of the lenses, polishing the flat surface of the lenses and the lens holder so that the polished flat surface of the lenses are flush with a polished flat surface of the lens holder, fixing the lenses to said flat glass plate with a second adhesive agent by pressing the lenses against the flat glass plate and hardening the second adhesive agent, and removing the lens holder from the lenses.

3 Claims, 9 Drawing Sheets

METHOD FOR MANUFACTURING LENS ARRAY OPTICAL SYSTEM

BACKGROUND OF THE INVENTION

The present invention relates to a method for manufacturing a lens array optical system comprising two lenses or more.

An example of a conventional method for manufacturing a lens array optical system is described below with reference to FIGS. 5 through 10.

FIG. 5 shows a lens array optical system comprising three plano-convex lenses 1 in the same configuration and a flat glass plate 2. FIG. 5A is a perspective view showing the lens array optical system. FIG. 5B is a plan view showing the lens array optical system of FIG. 5A. FIG. 5C is a side view showing the lens array optical system of FIG. 5A. The lenses 1 and the glass plate 2 are made of BK7 or synthetic quartz commercially available and adhered to each other with a heat-resistant adhesive agent which has a low degree of deformation and is hardened by ultra-violet rays.

The conventional method for manufacturing the lens array optical system as shown in FIG. 5 is described below with reference to FIG. 6.

According to the method, the glass plate 2 is inserted into a concave 13a of a flat glass plate holder 13 as shown in FIG. 6A. Then, a lens holder 14 is placed on the glass plate holder 13 as shown in FIG. 6B. An adhesive agent which has not hardened is applied to the flat surface 1d of the lens 1, and the lens 1 is then inserted into a through-hole 14a formed in the lens holder 14 as shown in FIGS. 6C and 7A, then, pressed against the glass plate 2. That is, the lens 1 is positioned in the lens array optical system by the inner configuration of the through-hole 14a of the lens holder 14 and the outer configuration of the lens 1. Finally, ultraviolet rays are irradiated over the lens 1 to harden the adhesive agent. Then, the glass plate holder 13 and the lens holder 14 are removed from the glass plate 2 and the lens 1. Thus, the lens array optical system is formed.

According to the conventional method as described above with reference to FIGS. 6A through 6D, each lens 1 is positioned in the lens array optical system by the inner configuration of the through-hole 14a of the lens holder 14 and the outer configuration of the lens 1. Then, the flat surface 1d of the lens 1 is adhered to the glass plate 2. Therefore, if a lens 1 is eccentric, the optical axis 5 of the lens 1 is not perpendicular to the glass plate 2. FIG. 8A shows a lens 1 which is not eccentric. FIG. 8B shows a lens 1 which is eccentric, so that the optical axis 5 thereof is not perpendicular to the glass plate 2.

For example, the pitches between the through-holes 14a of the lens holder 14 are designed as $p_1$ and $p_2$ as shown in FIG. 9A. Supposing that neither of the lenses 1 is not eccentric, the optical axes 5 thereof is perpendicular to the glass plate 2 and the pitches $q_1$ and $q_2$ between focal points 6 thereof are equal to the pitches $p_1$ and $p_2$ between the through-holes 14a of the lens holder 14, respectively, as shown in FIG. 9B. Since each lens 1 is actually eccentric, the optical axis 5 thereof is not perpendicular to the glass plate 2. Therefore, the pitches $r_1$ and $r_2$ between the focal points 6 thereof are unequal to the pitches $p_1$ and $p_2$, which are design values, between the through-holes 14a of the lens holder 14, respectively, as shown in FIG. 9C.

If the thicknesses of the lenses 1 of the lens array optical system are equal to each other, the focal lengths thereof (back focus: d) are equal to each other as shown in FIG. 10A. However, each lens 1 actually has an error in its thickness. Accordingly, the focal lengths (back focus: $d+\Delta d$) of the lenses 1 are different from each other as shown in FIG. 10B.

That is, according to the conventional method for manufacturing the lens array optical system, the optical accuracy of the lens array optical system such as the accuracy of the inclination of the optical axis of the lens 1 and the position of the focal point thereof depends on the processing accuracy of the lens holder 14, namely, the processing accuracy of the through-hole 14a and the processing accuracy of the lens 1, namely, the accuracy of the inclination of the optical axis thereof and the outer configuration and thickness thereof. Therefore, according to the conventional method, it is necessary to produce both of the lens holder 14 and the lens 1 with a high accuracy in order to manufacture a lens array optical system with a high accuracy. In order to manufacture a compact and thin lens array optical system, it is necessary to manufacture a compact and thin lens. But a lens of a high accuracy manufactured by the conventional method is very expensive even though it can be manufactured.

SUMMARY OF THE INVENTION

It is an object of the present invention to provide a lens array optical system which can be manufactured at a low cost and with a high accuracy.

In accomplishing these and other objects, according to an embodiment of the present invention, there is provided a method for manufacturing a lens array optical system comprising a flat glass plate and lenses each of which has a flat surface and a curved surface, comprising the steps of:

removably fixing each lens with a first adhesive agent to a lens holder having a lens holding portion corresponding to the curved surface of said lens;

polishing the flat surfaces of said lenses and said lens holder so that the polished flat surfaces of said lenses are flush with a polished flat surface of said lens holder;

fixing said lenses to said flat glass plate with a second adhesive agent by pressing said lenses against said flat glass plate and hardening said second adhesive agent; and removing said lens holder from said lenses.

According to the above manufacturing method, each lens is placed in position in the lens array optical system by using the lens holding portion of the lens holder to position the curved surface of the lens. Accordingly, the optical axis of each lens can coincide with the center axis of the lens holding portion of the lens holder and can be perpendicular to the flat glass plate. Consequently, the pitches between the optical axes of respective lenses are equal to the pitches between the lens holding portions of the lens holder.

Further, the lens is removably adhered to the lens holder and then, the flat surface of the lens and that of the lens holder are polished to be flush with each other. Thereafter, each lens of the lens holder is adhered to the glass plate. Therefore, the thicknesses of the lenses can be equal to each other and as such, the focal lengths (back focus: d) of the lenses can be equal to each other.

That is, according to the embodiment, the optical accuracy of the lens array optical system depends on the processing accuracy of the lens holder in particular and not on the processing accuracy of the lens. That is, in order to manufacture the lens array optical system with a high accuracy, it is not necessary to increase the processing accuracy of each lens. Rather it is necessary to increase the processing accuracy of the lens holder. As such, a compact and thin lens array optical system can be manufactured by increasing the processing accuracy of the lens holder. Therefore, the present invention is capable of manufacturing a lens array optical system at a low cost and with a high accuracy.

BRIEF DESCRIPTION OF THE DRAWINGS

These and other objects and features of the present invention will become clear from the following description taken in conjunction with the preferred embodiments thereof with reference to the accompanying drawings, in which.

DETAILED DESCRIPTION OF THE INVENTION

Figure 1A:
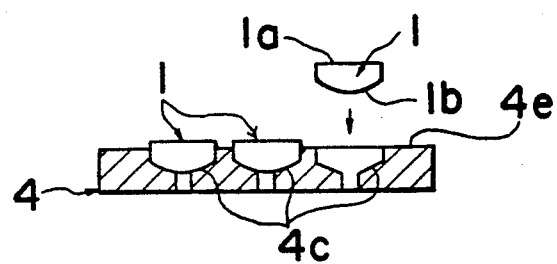
FIGS. 1A through 1E are views showing the steps of a method for manufacturing a lens array optical system according to a first embodiment of the present invention.

Before the description of the present invention proceeds, it is to be noted that like parts are designated by like reference numerals throughout the accompanying drawings.

FIG. 1 shows a method for manufacturing a lens array optical system according to a first embodiment of the present invention.

Figure 1B:
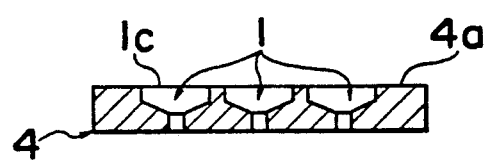
Figure 2A:
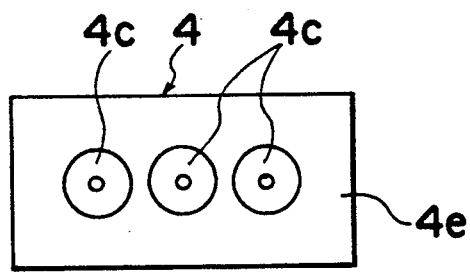
FIGS. 2A and 2B are plan and sectional views, respectively showing a lens holder according to the first embodiment of the present invention.
Figure 2B:
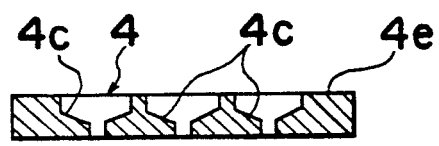
Figure 3:
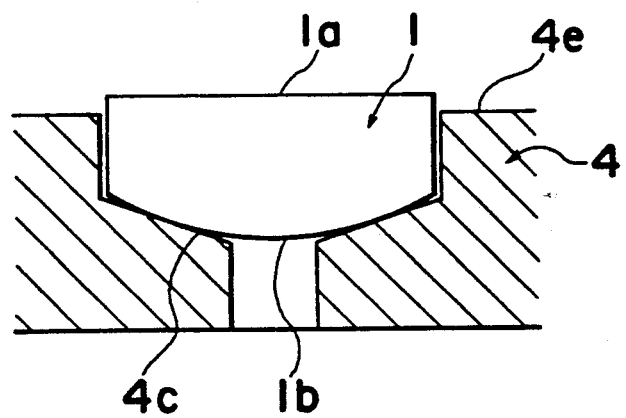
FIG. 3 is a sectional view showing a state in which a lens is inserted into the lens holder.

First, as shown in FIG. 1A, a first thermoplastic adhesive agent is applied to the convex surface 1b of a lens 1. Then, the lens 1 is inserted into a recessed lens holding portion, e.g. a concave portion 4c of a lens holder 4, with the flat surface 1a thereof facing upward and being removably adhered to the lens holder 4 with the first adhesive agent by pressing the lens 1 against the lens holder 4 as shown in FIG. 1B. The concave portion 4c of the lens holder is formed to correspond to the configuration of the curved surface of the lens 1. As shown in FIGS. 2A and 2B, the lens holder 4 has the concave portion 4c corresponding to the convex surface 1b of the lens 1. As such, each lens 1 is positioned in the lens array optical system not by regulating the outer configuration of the lens 1 but by regulating the convex surface 1b of the lens 1 by the concave portion 4c of the lens holder 4 as shown in FIG. 3. That is, the bottom of the concave of the lens holder 4 contacts and supports the lens 1 therein while the flat surface of the lens 1 is held upwardly and the convex surface of the lens 1 contacts the bottom.

Figure 2C:
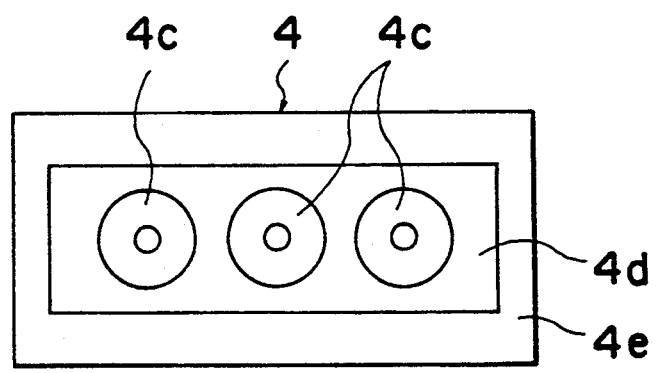
FIGS. 2C and 2D are plan and sectional views, respectively, showing a lens holder according to a second embodiment of the present invention.
Figure 2D:
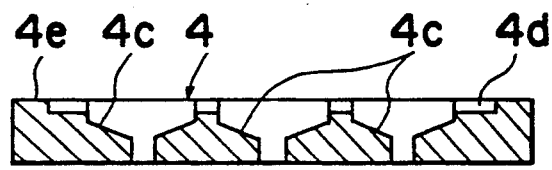

As shown in FIGS. 2C and 2D, a recess 4d can be formed around the concave portions 4c on the flat surface 4e of the lens holder 4. The recess 4d allows a second adhesive agent described later to enter so as to prevent the agent from intervening between the flat surface 2a of the flat glass plate 2 and the flat surface 4e of the lens holder 4 to produce an undesirable gap between them.

The flat surface 1a of each lens 1 and the flat surface 4d of the lens holder 4 are not flush with each other due to the eccentricity and thickness error of each lens 1 and the depth error of the concave portion 4c of the lens holder 4. Therefore, as shown in FIG. 1B, the flat surface 1a of each lens 1 and the flat surface 4e of the lens holder 4 are polished so that polished flat surfaces 1c and 4a are flush with each other.

Figure 1C:
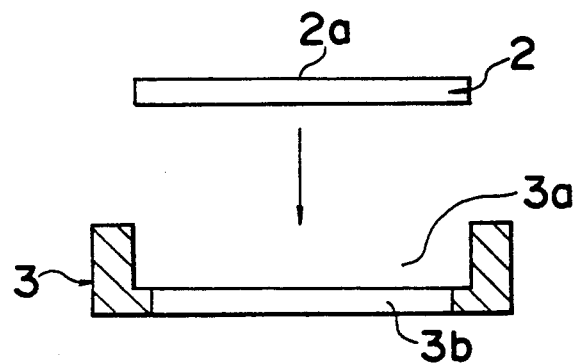

A flat glass plate 2 is inserted into a cavity 3a of a glass plate holder 3 as shown in FIG. 1C. The glass plate holder 3 has on its bottom a window 3b to which ultraviolet rays are irradiated.

Figure 1D:
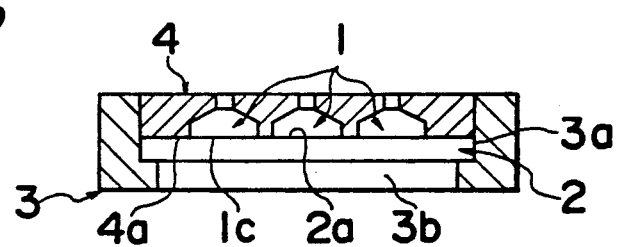

Then, as shown in FIG. 1B, a second heat-resistant adhesive agent which is to be hardened by ultraviolet rays is applied to the polished flat surface 1c of each lens 1 removably inserted into the lens, holder 4, and then the lens holder 4 is pressed against the flat surface 2a of the glass plate 2 placed in the cavity 3a of the glass plate holder 3 so that the polished flat surface 1c of each lens 1 can contact and adhere to the flat surface 2a of the glass plate 2 with the second adhesive agent. As shown in FIG. 1D, ultraviolet rays are irradiated to the second adhesive agent through the window 3b to harden the second adhesive agent. As a result, each lens 1 is fixed to the glass plate 2. The adhesive agent may be applied to the flat surface 2a of the glass plate 2.

Figure 1E:
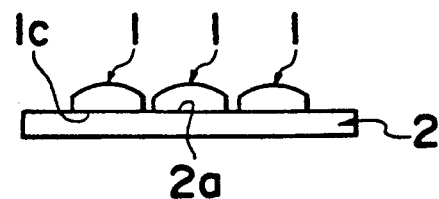

Finally, the glass plate holder 3 is removed from the glass plate 2 and the lens holder 4. Then, the lenses 1, the glass plate 2, and the lens holder 4 are warmed to melt the first adhesive agent adhering the lenses 1 to the lens holder 4. At this time, it is necessary not to remove the lenses 1 from the glass plate 2. Then, the lens holder 4 is removed from the lenses 1. Thus, the lens array optical system is formed as shown in FIG. 1E.

Since the lens 1 is positioned in the lens array optical system not by used of the outer configuration of the lens 1 but by using the concave portion 4c of the lens holder 4 to position the convex surface 1b of the lens 1, the optical axis 5 of each lens 1 coincides with the center axis of the concave portion 4c of the lens holder 4 and is perpendicular to the glass plate 2. Accordingly, the pitches $q_1$ and $q_2$ between the optical axes 5 of the lenses 1 are equal to the pitches $p_1$ and $p_2$ between the concave portions 4c of the lens holder 4, respectively.

As described above, each lens 1 is removably adhered to the lens holder 4 and then, the flat surface 1a of the lens 1 and the flat surface 4d of the lens holder 4 are polished to be flush with each other. Thereafter, each lens 1 of the lens holder 4 is adhered to the glass plate 2.

Figure 4A:
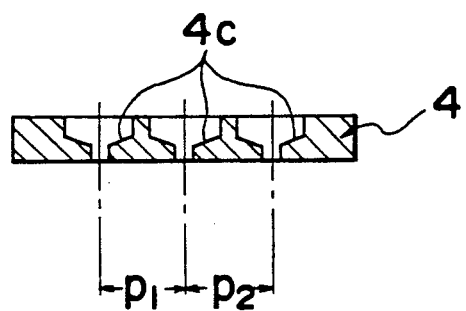
FIGS. 4A and 4B are descriptive views showing the pitches between the focal points of lenses according to the present invention.
Figure 4B:
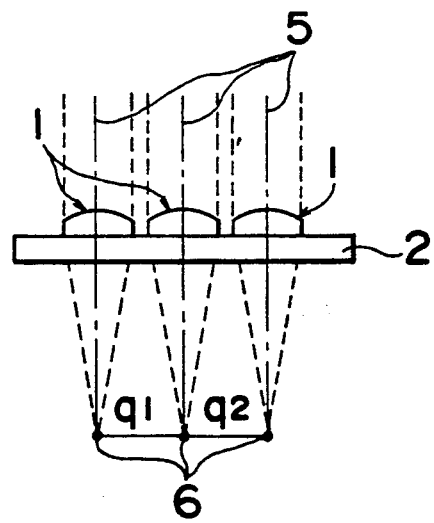
Figure 5A:
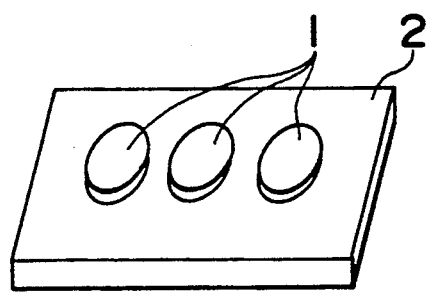
FIGS. 5A through 5C are perspective, plan, and side views, respectively showing a lens array optical system.
Figure 5B:
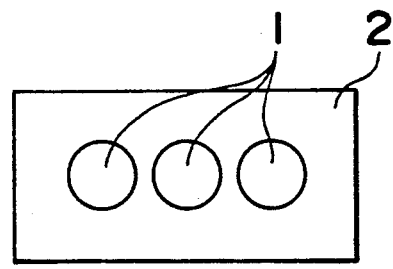
Figure 5C:
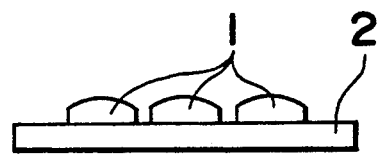
Figure 6A:
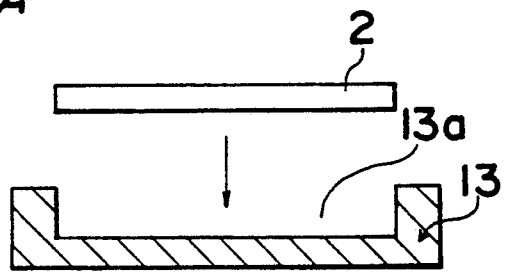
FIGS. 6A through 6D are views showing the process of a conventional method for manufacturing a lens array optical system.
Figure 6B:
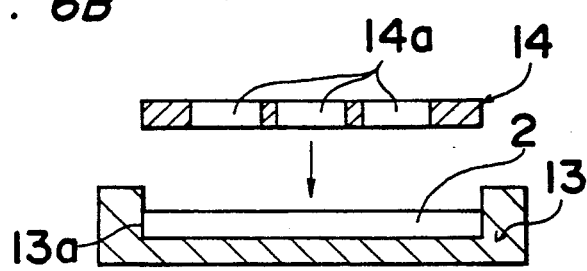
Figure 6C:
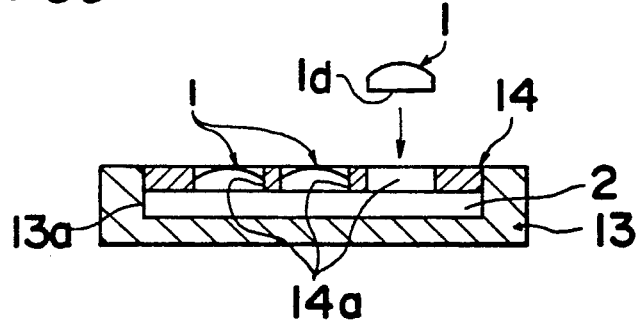
Figure 6D:
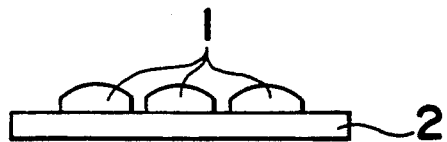
Figure 7A:
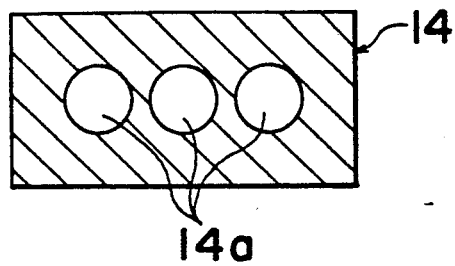
FIGS. 7A and 7B are plan and sectional views, respectively showing a conventional lens holder.
Figure 7B:
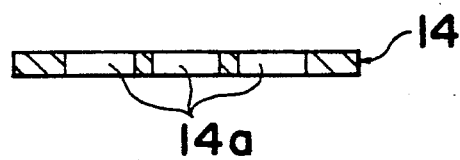
Figure 8A:
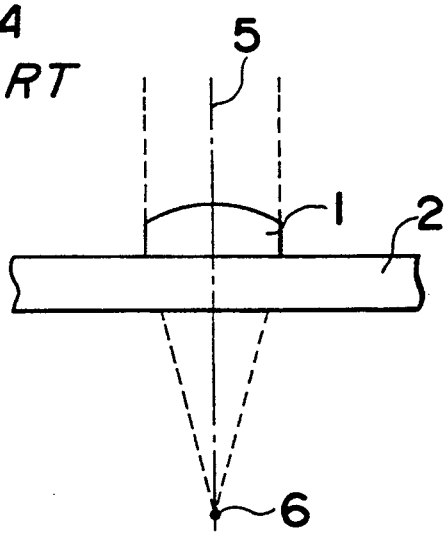
FIGS. 8A and 8B are descriptive views showing a difference in the inclination of the optical axis of a lens of the conventional lens array optical system.
Figure 8B:
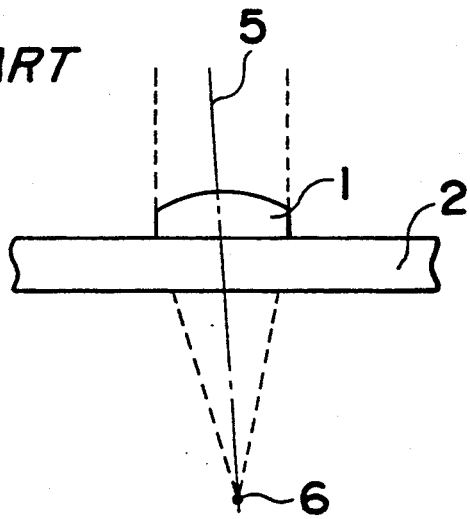
Figure 9A:
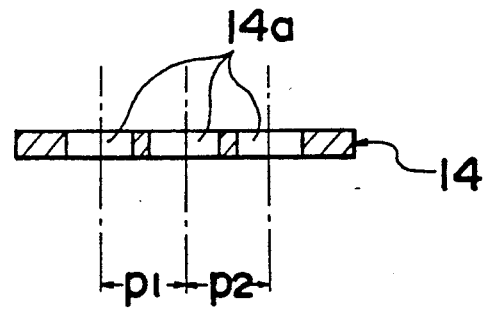
FIGS. 9A through 9C are descriptive views showing the pitches between the focal points of lenses in the conventional lens array optical system.
Figure 9B:
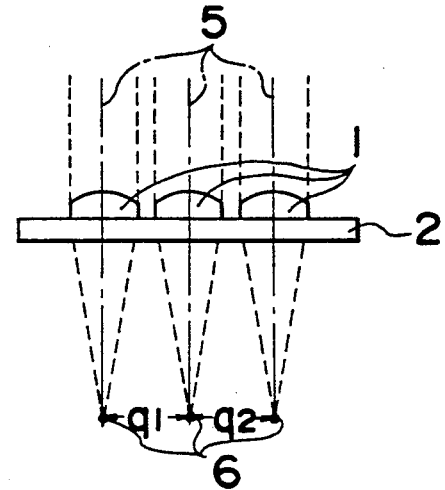
Figure 9C:
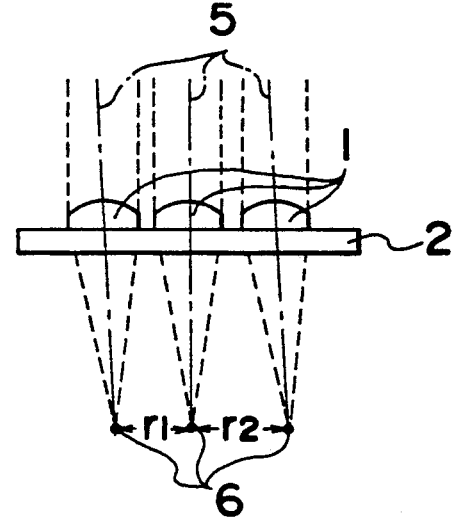
Figure 10A:
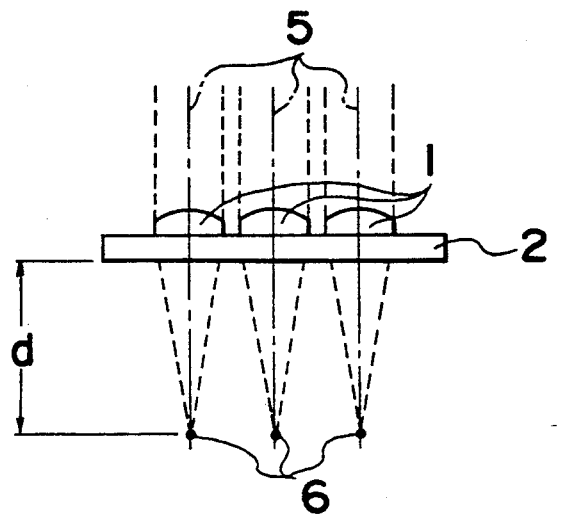
FIGS. 10A and 10B are descriptive views showing the focal length of each lens in the conventional lens array optical system.
Figure 10B:
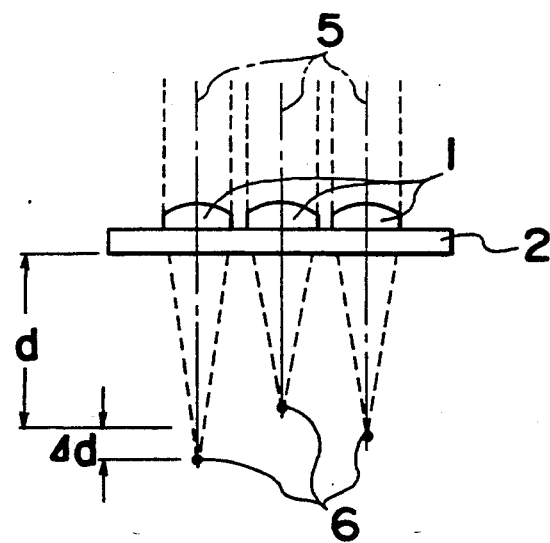

Therefore, the thicknesses of the lenses 1 are equal to each other and as such, the focal lengths (back focus: d) of the lenses 1 are equal to each other as shown in FIGS. 4A and 4B.

That is, according to the invention, the optical accuracy of the lens array optical system such as the accuracy of the inclination of the optical axis of the lens and the position of the focal point thereof depends on the processing accuracy of the lens holder 4, namely, the processing accuracy of the concave portion 4c of the lens holder 4 and not on the processing accuracy of the lens 1, namely, the inclination of the optical axis thereof and the accuracy of the outer configuration and thickness thereof. That is, in order to manufacture the lens array optical system with a high accuracy, it is not necessary to increase the processing accuracy of each lens 1. Rather, it is necessary only to increase the processing accuracy of the lens holder 4. As such, the compact and thin lens array optical system can be manufactured by increasing the processing accuracy of the lens holder 4. Therefore, the present invention is capable of manufacturing the lens array optical system at a low cost and with a high accuracy.

Although the present invention has been fully described in connection with the preferred embodiments thereof with reference to the accompanying drawings, it is to be noted that various changes and modifications are apparent to those skilled in the art. Such changes and modifications are to be understood as included within the scope of the present invention as defined by the appended claims unless they depart therefrom.

What is claimed is:

1. A method for manufacturing a lens array optical system comprising a flat glass plate and a plurality of lenses, each of which has a flat surface and a curved surface, comprising the steps of:

removably fixing the lenses with a first adhesive agent in recessed lens holding portions of a lens holder, said recessed lens holding portions being formed to open through a flat surface of said lens holder and corresponding to the curved surfaces of said lenses, respectively;

polishing the flat surfaces of said lenses and said lens holder to make the flat surfaces of said lenses flush with said flat surface of said lens holder;

fixing said lenses to said flat glass plate with a second adhesive agent by pressing said lenses against said flat glass plate and hardening said second adhesive agent; and removing said lens holder from said lenses.

2. The method for manufacturing a lens array optical system, as claimed in claim 1, wherein the first adhesive agent is a thermoplastic adhesive agent and the second adhesive agent is a heat-resistant adhesive agent to be hardened by ultraviolet rays.

3. The method for manufacturing a lens array optical system, as claimed in claim 1, wherein the lens holder has a recess formed in said flat surface thereof about the recessed lens holding portions so that the second adhesive agent can enter said recess in the fixing step.

* * * * *